(12) United States Patent  
Horiguchi

(10) Patent No.: US 8,039,163 B2
(45) Date of Patent: Oct. 18, 2011

(54) SEPARATOR AND FUEL CELL USING THAT SEPARATOR

(75) Inventor: Munehisa Horiguchi, Aichi (JP)

(73) Assignee: Kabushikikaisha Equos Research, Tokyo (JP)

( * ) Notice: Subject to any disclaimer, the term of this patent is extended or adjusted under 35 U.S.C. 154(b) by 1499 days.

(21) Appl. No.: 11/087,682

(22) Filed: Mar. 24, 2005

(65) Prior Publication Data

US 2005/0221146 A1    Oct. 6, 2005

(51) Int. Cl.
*H01M 2/00* (2006.01)
*H01M 2/14* (2006.01)
*H01M 8/10* (2006.01)

(52) U.S. Cl. .................... 429/457; 429/456; 429/468
(58) Field of Classification Search .................... None
See application file for complete search history.

(56) References Cited

U.S. PATENT DOCUMENTS

| | | | |
|---|---|---|---|
| 3,432,357 A | 3/1969 | Dankese | |
| 4,548,876 A | 10/1985 | Bregoli | |
| 5,776,624 A | 7/1998 | Neutzler | |
| 5,919,584 A | 7/1999 | Akagi | |
| 5,972,530 A | 10/1999 | Shelekhin et al. | |
| 6,296,964 B1 | 10/2001 | Ren et al. | |
| 6,444,340 B1 | 9/2002 | Jaffrey | |
| 6,468,681 B1 | 10/2002 | Horiguchi | |
| 6,835,477 B1 | 12/2004 | Brambilla et al. | |
| 7,056,608 B2 | 6/2006 | Lloyd et al. | |
| 7,150,931 B1 | 12/2006 | Jaffrey | |
| 2003/0082423 A1 | 5/2003 | Kushibiki et al. | |
| 2003/0087140 A1 | 5/2003 | Kikuchi et al. | |
| 2004/0101742 A1 * | 5/2004 | Simpkins et al. | ............... 429/44 |
| 2004/0137304 A1 | 7/2004 | Tanaka et al. | |
| 2004/0200187 A1 * | 10/2004 | Warrier et al. | ............... 52/782.1 |
| 2005/0250003 A1 | 11/2005 | Zagaja et al. | |

FOREIGN PATENT DOCUMENTS

| | | | |
|---|---|---|---|
| DE | 19517443 A1 * | 11/1996 | |
| GB | 2240988 A | 8/1991 | |
| JP | 61-216257 A | 9/1986 | |
| JP | 05-029009 | 2/1993 | |
| JP | 06-044981 | 2/1994 | |
| JP | 6-338338 | 12/1994 | |
| JP | 07-254424 | 10/1995 | |
| JP | 08-306371 | 11/1996 | |
| JP | 10-274505 | 9/1998 | |
| JP | 10-340734 | 12/1998 | |
| JP | 2002-184422 | 6/2002 | |
| JP | 2003-197217 A | 11/2003 | |
| JP | 2003-331852 A | 11/2003 | |
| WO | WO 0148852 A1 * | 7/2001 | |

* cited by examiner

*Primary Examiner* — Robert Hodge
(74) *Attorney, Agent, or Firm* — Bacon & Thomas, PLLC

(57) ABSTRACT

A separator of a fuel cell, which is inserted between single cells, each single cell having an electrolyte sandwiched between electrodes, in order to stack the single cells together, includes gas diffusion portions which are arranged so as to cover a surface of the electrodes and in which are formed multiple air holes for gas diffusion, and spacer portions which form parallel divided gas passages on the back side of portions of the gas diffusion portions which cover the surface of the electrodes. The gas diffusion portions and the spacer portions are integrally formed by bending a wire mesh member to have a rectangular corrugated plate shaped cross-section. As a result, the air holes are formed evenly between the electrodes and the separator and high contact pressure is ensured by the contact of the fine wire mesh, thereby making it possible to both have the gas diffuse evenly and reduce the power collection resistance.

6 Claims, 8 Drawing Sheets

SEPARATOR AND FUEL CELL USING THAT SEPARATOR

BACKGROUND OF THE INVENTION

1. Field of the Invention

The present invention relates to a fuel cell, and more particularly, to a separator interposed between single cells of a fuel cell.

2. Description of the Related Art

Various types of fuel cells exist, one of which is a polymer electrolyte fuel cell that is particularly well suited for use in vehicles due to its small size which is made possible by a low reaction temperature. This type of fuel cell is based on units of membrane electrode assemblies (MEAs), each MEA having a polymer electrolyte membrane sandwiched between two gas diffusion electrodes (each of which includes a catalyst layer and a porous support layer (i.e., a gas diffusion layer)). A separator that also acts as a supply channel for reaction gases such as hydrogen (i.e., the fuel gas) and oxygen (i.e., the oxidizing gas) is arranged on the outside of each membrane electrode assembly. The separator both acts as an impermeable barrier for the reaction gases, and collects power in order to extract the generated electric current to the outside. The MEA and separator together constitute one fuel cell unit. In an actual polymer electrolyte fuel cell, many of these fuel cell units are stacked together in series to form a cell module.

In order to maintain sufficient power generation efficiency with polymer electrolyte fuel cells, the electrolyte membrane must be kept sufficiently moist. Since the moisture from only the water produced by the electrolytic reaction is generally not sufficient, it is necessary to provide a mechanism to supply humidifying water to each MEA. Further, the electrolytic reaction generates heat of a heat quantity that substantially corresponds to the power generated, so a cooling mechanism must be used to prevent the fuel cell itself from heating up excessively.

For this cooling mechanism, the applicant proposes technology which mixes humidifying water in a mist state with the reaction gas to be supplied to the air electrode, such that it is supplied together with the reaction gas to the gas diffusion electrode. In attempt to improve manufacturability of the separator and make the fuel cell thinner, this technology employs a structure in which the separator is a corrugated (i.e., wavy) thin metal plate with air holes provided in a portion midway between the mountain peaks and the mountain bases in the corrugated plate. The reaction gas and the humidifying water which has been vaporized by heat from the separator are then supplied to the gas diffusion electrodes through these air holes. With this structure, the vaporization of the humidifying water within the gas supply passages can also be used for latent heat cooling.

Japanese Patent Laid-Open Publication No. 2002-184422 discloses one example of related art in which a separator of a polymer electrolyte fuel cell is made of a thin metal plate. This technology aims to maintain contact pressure following settling of the gas diffusion electrodes by employing a structure in which parallel slits are continuously formed in a metal plate serving as the separator. The portions between adjacent slits are then bent such that the metal plate is wavy shaped with offset phases, and thus is elastic. The cut portions created between the waves by the offset phases serve as air holes.

Also, Japanese Patent Laid-Open Publication No. 7-254424 proposes a fused carbonate fuel cell, which is a different type of fuel cell than the one described above, in which the collector plate (i.e., the separator) is formed of a corrugated thin plate, and a plurality of holes are provided through the thin plate at the top portion on the side that is in contact with the anode or the cathode.

With the technology disclosed in Japanese Patent Laid-Open Publication No. 2002-184422, lessening the pitch of the waves in order to ensure contact area reduces air flow, while increasing the pitch of the waves in order to ensure air flow conversely reduces the contact area. As a result, it is considered difficult to ensure both the contact area and the air flow at the same time. Further, in order to ensure the passage area, the waves must be at least a certain height, and in view of ensuring the contact pressure, the pitch of the waves has to be large.

Next, with the related technology disclosed in Japanese Patent Laid-Open Publication No. 7-254424, because the structure has holes for supplying gas provided only at the top portion of the thin collector plate that is in contact with the anode or cathode, the machining for opening the holes in the collector plate is done at the top portion of the waves, which is approximately only several millimeters wide, so it is considered a difficult operation that requires extreme skill.

Also, even if a structure in which holes are provided only at the top portion of the waves, as described above, can be applied with no problem to a fused carbonate fuel cell in which there is no diffusion layer on the electrodes, the same structure will pose problems if applied to a polymer electrolyte fuel cell in which a diffusion layer is provided on the electrodes. That is, in this structure, the holes must be positioned away from the curved portion of the wave and toward the inside, in the width direction, of the top portion to some extent. As a result, the aperture ratio may be restricted in some areas along the curved portion, in particular, of the contact surface that contacts the anode or cathode, such that the diffusion of the gas supplied may be uneven in view of the entire contact surface. Moreover, if the technology proposed earlier (i.e., mixing and supplying reaction gas and cooling water) by the applicant were to be applied to this technology, the cooling may be uneven, membrane moistening may be uneven, and furthermore, the supply of gas may be uneven due to clogging of the cooling water. Thus, problems exists with respect to the general applicability of the technology disclosed in Japanese Patent Laid-Open Publication No. 7-254424 to different types of fuel cells.

Furthermore, with a structure in which contact is made with a surface having a small aperture ratio (a surface with a large area), as described above, the contact surface must be extremely flat or else the actual power collecting surface will decrease due to only localized contact, which would result in higher power collection resistance.

SUMMARY OF THE INVENTION

In view of the foregoing problems, the main object of the present invention is to supply gas, provide cooling, maintain membrane moisture, and reduce power collection resistance in a fuel cell by means of a simple separator structure that has high manufacturability.

In order to achieve this object, the present invention provides a separator of a fuel cell that is inserted between single cells, each single cell having an electrolyte sandwiched between electrodes, in order to stack the single cells together. The separator is characterised by including gas diffusion portions which are arranged so as to cover a surface of the electrodes and in which are formed multiple air holes for gas diffusion, and spacer portions which form parallel divided gas passages on the back side of portions of the gas diffusion portions which cover the surface of the electrodes, wherein the gas diffusion portions and the spacer portions are integrally formed by bending a wire mesh member to have a rectangular corrugated plate shaped cross-section.

Next, the invention also provides a fuel cell in which a separator that is inserted between single cells, each single cell having an electrolyte sandwiched between electrodes, in order to stack the single cells together. The fuel cell is characterised in that the separator includes gas diffusion portions which are arranged so as to cover a surface of the electrodes and in which are formed multiple air holes for gas diffusion, and spacer portions which form parallel divided gas passages on the back side of portions of the gas diffusion portions which cover the surface of the electrodes, wherein the gas diffusion portions and the spacer portions are integrally formed by bending a wire mesh member to have a rectangular corrugated plate shaped cross-section.

In the foregoing structure, it is effective that the wire mesh member is repeatedly bent in a rectangular corrugated plate shape with the width of the gas diffusion portion being 4 and the distance between adjacent gas diffusion portions being equal to, or less than, 1

The wire mesh member preferably has an aperture ratio of equal to, or greater than, 25% and is preferably such that the hole diameter of the air holes is 0.5 mm to 1.0 mm, inclusive.

Further, the wire mesh member is preferably such that the distance between edges of adjacent air holes is substantially constant.

Also, the wire mesh member is preferably such that the shape of the air holes is circular, rectangular, diamond-shaped, or hexagonal.

Next, the present invention provides a fuel cell in which a separator that is inserted between single cells, each single cell having a polymer electrolyte membrane sandwiched between electrodes, in order to stack the single cells together. The fuel cell is characterised in that the separator includes gas diffusion portions which are arranged so as to cover a surface of the electrodes and in which are formed multiple air holes for gas diffusion, and spacer portions which form parallel divided gas passages on the back side of portions of the gas diffusion portions which cover the surface of the electrodes, and the gas diffusion portions and the spacer portions are integrally formed by bending wire mesh to have a rectangular corrugated plate shaped cross-section.

It is particularly effective to have the single cell of this structure be formed by sandwiching the polymer electrolyte membrane between carbon cloth via a catalyst layer; and the gas diffusion portions be structured such that the distance between edges of adjacent air holes is equal to, or less than, 0.3 mm in order to reduce the area over which water produced by the single cell adheres and disperse the pressure toward the carbon cloth over the entire surface.

According to the present invention, the gas diffusion portions and the spacer portions which form the separator are formed integrally by bending the wire mesh member in the shape of a corrugated plate. As a result, the area of the gas supply passage is determined by the height of the waves of the wire mesh member, and the air flow and diffusivity are determined, irrespective of the wave height, by the fineness of the mesh of the wire mesh member. Therefore, according to this structure, the aperture ratio of the portion which covers the surface of the gas diffusion electrodes can be made even while sufficiently ensuring the area of the gas passage.

Also, the area of the contact surface of the separator and the gas diffusion electrodes can be made small for sufficient gas diffusion, while an even contact surface with high contact pressure from contact with the fine wire mesh can be ensured over the entire gas diffusion portion. As a result, power collection resistance can also be reduced.

Furthermore, because the separator is formed by bending the mesh member, the manufacturability of not only the separator, but also the fuel cell, can be improved by a simple process that does not require a high degree of skill.

In particular, when the wire mesh member is repeatedly bent in rectangular wave shapes in which the width of the gas diffusion portion is 4 and the distance between adjacent gas diffusion portions is 1, pressure loss in the gas supply passage is reduced such that gas can be supplied more efficiently to the gas diffusion electrodes.

DETAILED DESCRIPTION OF THE PREFERRED EMBODIMENTS

The present invention is particularly effective when applied to a polymer electrolyte fuel cell that produces water as a result of a reaction between a fuel gas and an oxidizing gas. More particularly, the present invention is effective when applied to a separator provided in contact with a gas diffusion layer on an air electrode side from which water that was produced is discharged. That is, after the water that was produced in the gas diffusion layer is discharged through air holes in the wire mesh, it is discharged downward through the fine and evenly spaced mesh of the mesh member of the wire mesh. As a result, the water produced does not clog the gas diffusion layer and the mesh of the wire mesh. Further, since the passage and diffusion of the gas supplied is not inhibited, it is possible to prevent a decrease in the efficiency that would occur due to uneven gas diffusion.

First Embodiment

Figure 1:
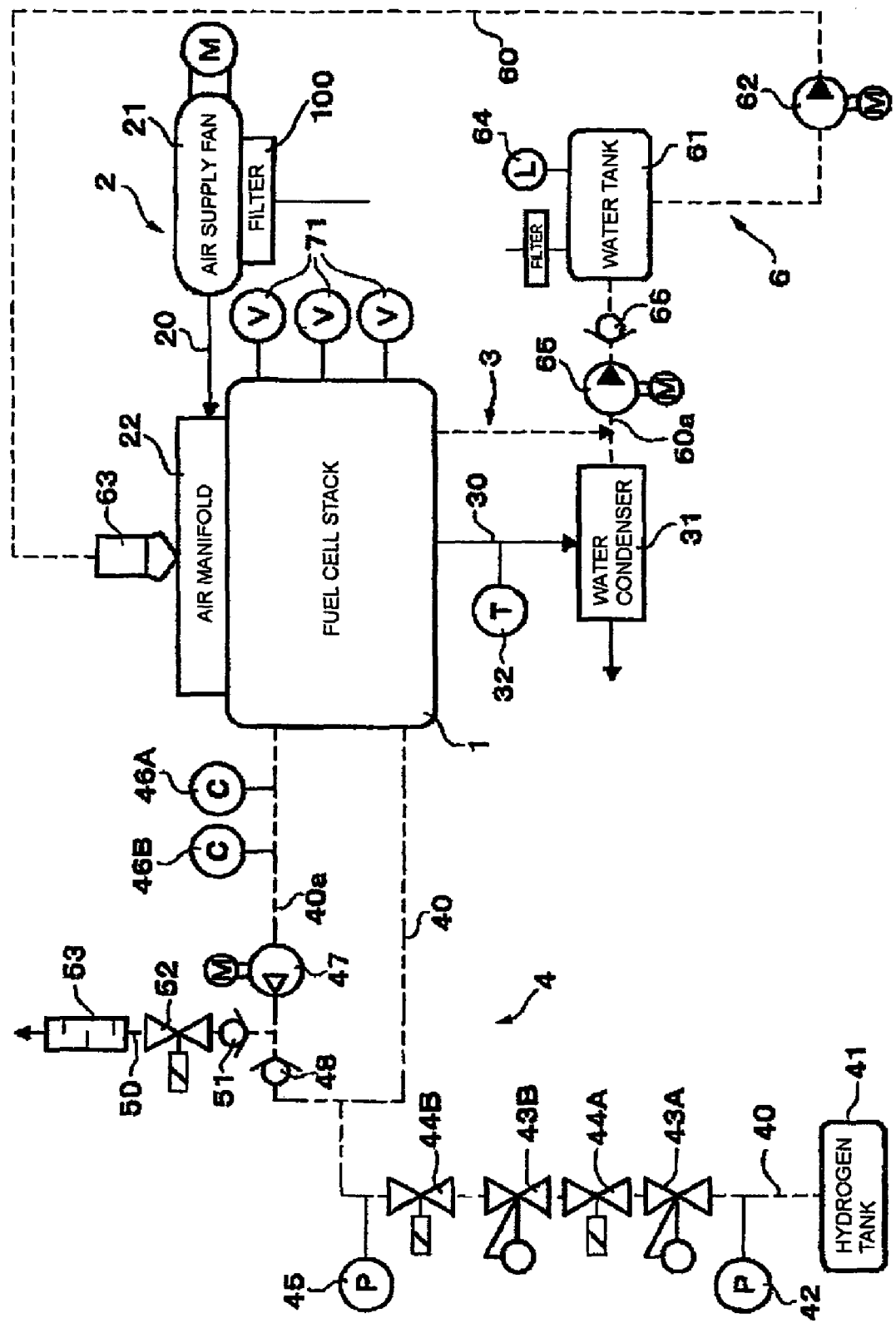
FIG. 1 is a block view of a fuel cell system.

Hereinafter, exemplary embodiments of the present invention will be described with reference to the appended drawings. First, FIGS. 1 to 7 illustrate a first exemplary embodiment of the present invention. FIG. 1 is an example of a diagram of a vehicular fuel cell system which uses a fuel cell stack 1 according to one application of the present invention. The fuel cell stack 1 serves as the main component of the fuel cell system which also includes a fuel cell main portion, a fuel supply system 4, and a water supply system 6. The fuel cell main portion includes i) an air supply system (indicated by the solid lines in the drawing) 2 including an air fan 21 which serves as an air supply mechanism that supplies air to the fuel cell stack 1, and ii) an air exhaust system 3 including a water condenser 31. The fuel supply system 4 (indicated by the alternate long and two short dashes line in the drawing) includes a hydrogen tank 41 which serves as a hydrogen supply mechanism. The water supply system 6 (indicated by the broken line in the drawing) serves to moisten and cool the reaction portion.

The air fan 21 disposed in the main portion of the fuel cell is connected to an air manifold 22 via an air supply line 20. The air manifold 22 is in turn connected to a case, not shown, which houses the fuel cell stack. The water condenser 31 is interposed in an air discharge line 30 of the case and connected to the fuel cell stack 1. An exhaust temperature sensor 32 is arranged in the air discharge line 30.

The fuel supply system 4 is provided in order to deliver hydrogen stored in the hydrogen tank 41 to hydrogen passages in the fuel cell stack 1 via the hydrogen supply line 40. Provided in the hydrogen supply line 40 are, in order from the hydrogen tank 41 side to the fuel cell stack 1 side, a primary pressure sensor 42, a pressure regulating valve 43A, a supply electromagnetic valve 44A, a pressure regulating valve 43B, a supply electromagnetic valve 44B, and a secondary pressure sensor 45. Incidentally, a hydrogen return line 40a and a hydrogen discharge line 50 are also provided in the hydrogen supply line 40. Arranged in the hydrogen return line 40a, in order from the fuel cell stack 1 side, are hydrogen concentration sensors 46A and 46B, a suction pump 47, and a check valve 48. A portion of the hydrogen return line 40a that is downstream of the check valve 48 is connected to the hydrogen supply line 40. The hydrogen discharge line 50 is connected to the hydrogen return line 40a between the suction pump 47 and the check valve 48. A check valve 51, a discharge electromagnetic valve 52, and a combustor 53 are provided in the hydrogen discharge line 50.

The water supply system 6 is provided in order to deliver water stored in a water tank 61 to multiple nozzles 63 disposed in the air manifold 22 of the fuel cell stack 1 via a water supply line 60. A pump 62 is arranged in the water supply line 60. Also, a level sensor 64 is disposed in the water tank 61. The water supply system 6 also has a water return line 60a that connects the fuel cell stack 1 to the water tank 61. A pump 65 and a check valve 66 are arranged in the water return line 60a. The water return line 60a is connected to the water condenser 31 at the upstream side of the pump 65. Voltage meters 71 in the drawing monitor the back electromotive voltage of the fuel cell.

When the fuel cell system of the foregoing structure is operating, the air supply fan 21 supplies air to the air manifold 22, the pump 62 supplies water from the water supply system, and the supply electromagnetic valves 44A and 44B supply hydrogen from the fuel supply system 4.

At this time, in the fuel supply system 4, the hydrogen primary pressure sensor 42 monitors the hydrogen pressure on the hydrogen tank 41 side, and the hydrogen regulating valves 43A and 43B regulate the pressure so that it is suitable for being supplied to the fuel cell stack 1. The supply of hydrogen to the fuel cell stack 1 is then electrically controlled by opening or closing the supply electromagnetic valves 44A and 44B. The supply of hydrogen gas can be interrupted by closing the supply electromagnetic valves 44A and 44B. Further, the hydrogen secondary pressure sensor 45 monitors the hydrogen gas pressure immediately before the hydrogen gas is supplied to the fuel cell stack 1. Also, in the water supply system 6, the pump 62 delivers water from the water tank 61 to the nozzles 63 provided in the air manifold 22. From here, the water is either continuously or intermittently injected into the air manifold 22, where it mixes as mist with the air flow and is delivered into the fuel cell stack 1.

FIGS. 2 to 7 show the structure of a cell module 10, which is the unit of which the fuel cell stack 1 in the fuel cell system of the foregoing structure is formed. As shown by the top surface in FIG. 2 (hereinafter, the top/bottom and vertical/horizontal relationships in view of the position in which the cell module is arranged will be described), the cell module 10 is formed of a plurality of sets (the example in the drawing shows 10 sets) stacked together in the direction of thickness, each set including a single cell (MEA) 10A, a separator 10B which electrically connects pairs of single cells together and separates the flow passage of the hydrogen gas introduced into the single cells from the air flow passage, and two kinds of frames 17 and 18 that support the single cells 10A and the separator 10B.

Figure 2:
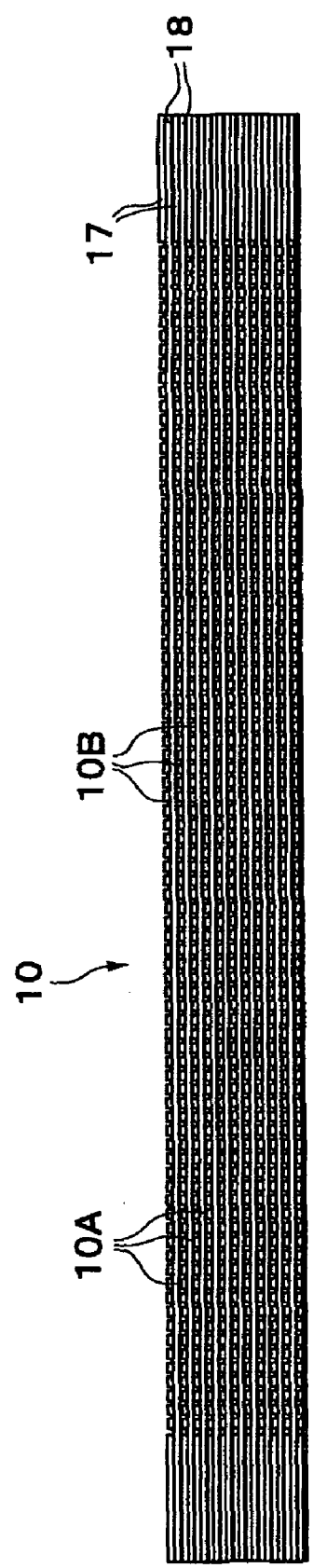
FIG. 2 is a plan view of a cell module which forms a fuel cell stack according to a first exemplary embodiment of the present invention.
Figure 3:
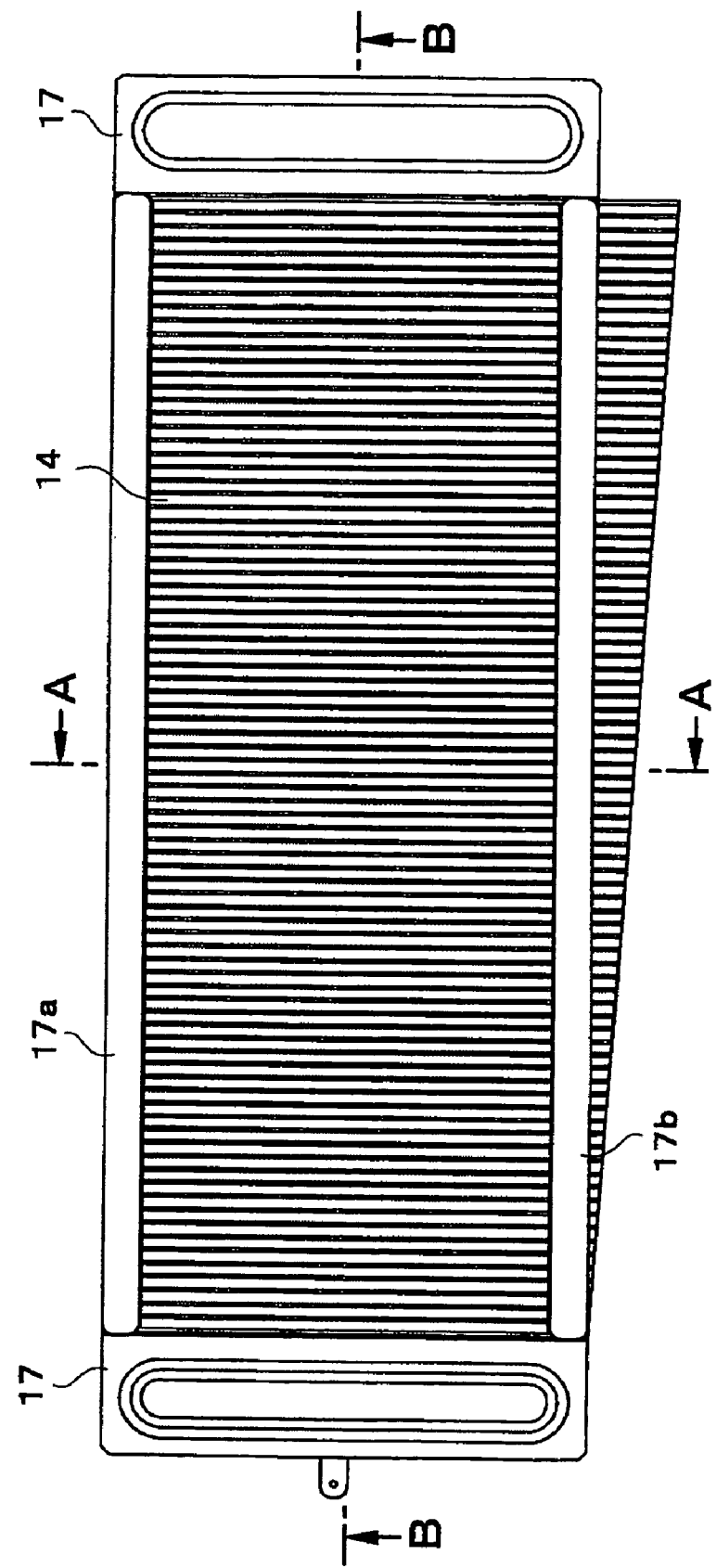
FIG. 3 is a front view of the cell module as viewed from an air electrode side.
Figure 4:
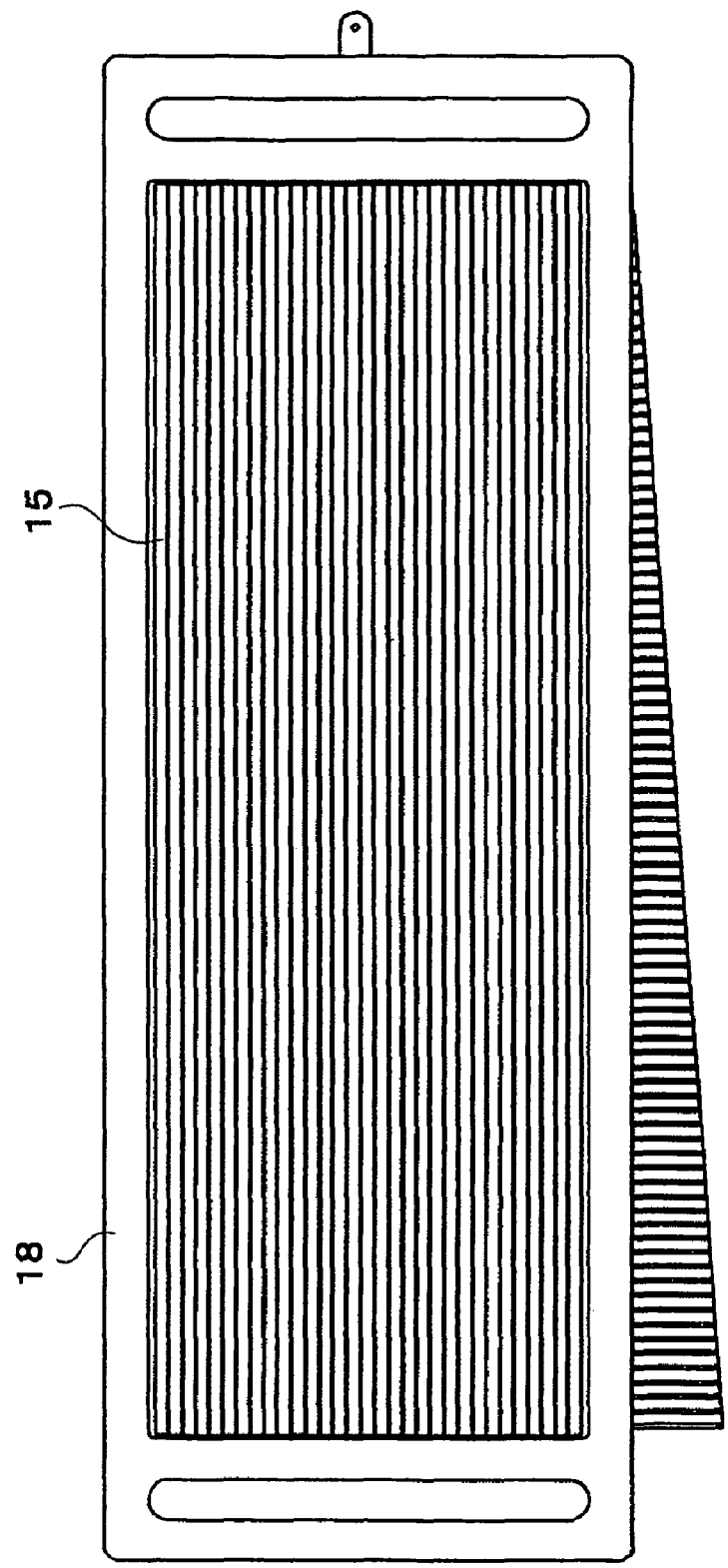
FIG. 4 is a front view of the cell module as viewed from a fuel electrode side.

The single cell 10A is positioned inside of the frame 18 so it is not clearly visible in FIG. 2. The cell module 10 is such that the single cells 10A and the separators 10B are stacked with the two kinds of frames 17 and 18 stacked alternately in multiple levels such that the single cells 10A are arranged a predetermined distance away from each other. One end, in direction of stacking, of the cell module 10, (i.e., the upper end side in FIG. 2) ends with the surface of the separator 10B that has protrusions formed in the vertical direction and the end face of one frame 17, as shown in FIG. 3. The other end (the lower end side in FIG. 2) of the cell module 10 ends with the surface of the separator 10B that has protrusions formed in the horizontal direction and the end face of the other frame 18, as shown in FIG. 4.

Figure 5:
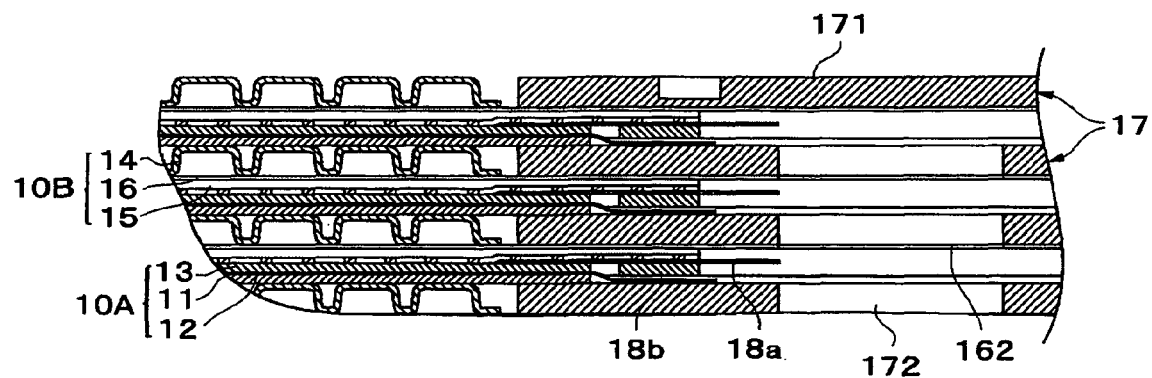
FIG. 5 is a top view of part of a horizontal cross-section taken along line B-B in FIG. 3.
Figure 6:
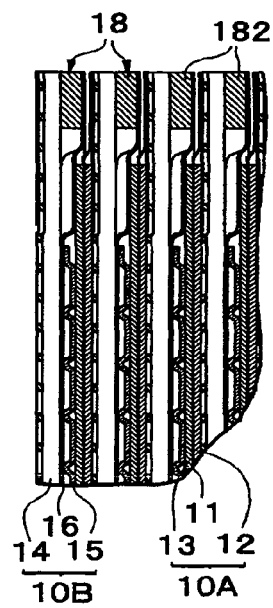
FIG. 6 is a side view of part of a vertical cross-section taken along line A-A in FIG. 3.
Figure 7:
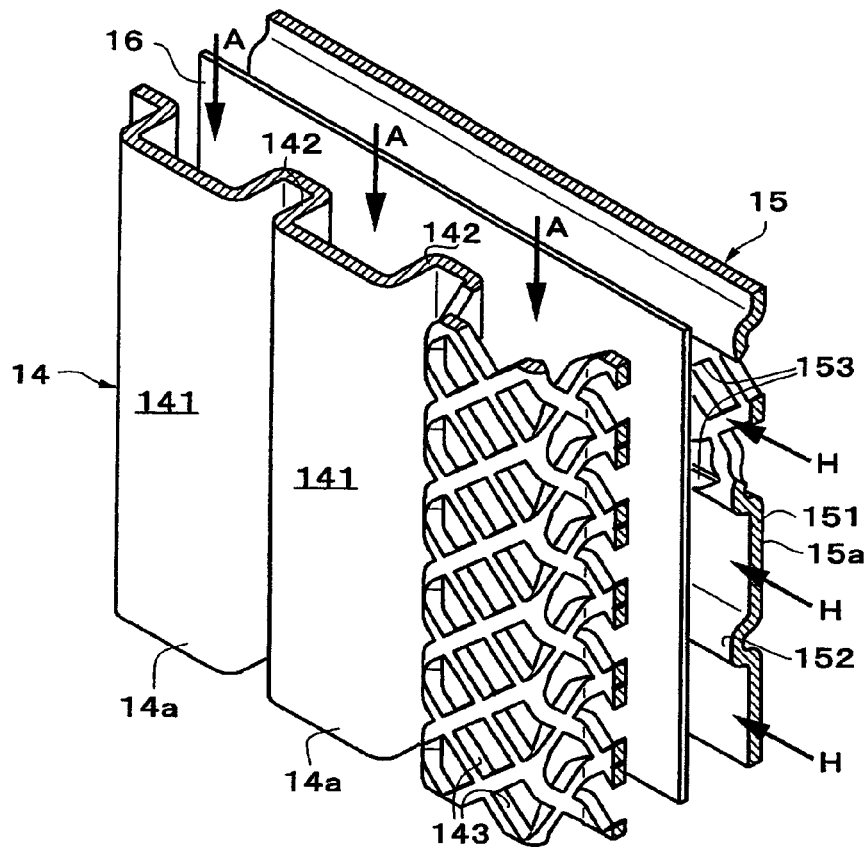
FIG. 7 is a partial exploded perspective view of a portion of a separator of the cell module.

As shown in the exploded sectional diagrams of FIGS. 5 and 6, the single cell 10A includes a polymer electrolyte membrane 11, an air electrode 12 which is an oxidant electrode provided on one side of the polymer electrolyte membrane 11, and a fuel electrode 13 provided on the other side of the polymer electrolyte membrane 11. The air electrode 12 and the fuel electrode 13 are formed of a gas diffusion layer of conductive material such as carbon cloth through which the reaction gas permeates while diffusing, as described above, and a catalyst layer including catalyst material sandwiched between this diffusion layer and the polymer electrolyte membrane 11. Of these members, the air electrode 12 and the fuel electrode 13 have horizontal dimensions that are slightly longer than the width of an open portion of the frame 18 which serves as a support member for the air electrode 12 and the fuel electrode 13, and vertical dimensions that are slightly shorter than the height of that open portion. Further, the polymer electrolyte membrane 11 has vertical and horizontal dimensions which are one size larger than the vertical and horizontal dimensions of the open portion.

The separator 10B includes a separator substrate 16, a collector (hereinafter, referred to as "air electrode side collector") 14, and a conductor (hereinafter, referred to as "fuel electrode side collector") 15. The separator substrate 16 serves as a gas interruption member between single cells 10A. The air electrode side collector 14 is provided on one side of the separator substrate 16 and is formed of a mesh member in which multiple air holes are formed through which pass a mixture of air and water, and which contacts the gas diffusion layer on the air electrode side of the single cell 10A and collects power. The fuel electrode side collector 15 is provided on the other side of the separator substrate 16 and is in contact with the gas diffusion layer on the fuel electrode side of the single cell 10A. The fuel electrode side collector 15 is also formed of a mesh member for leading voltage to the outside.

In order to maintain a predetermined positional relationship of the separator substrate 16, the air electrode side collector 14, and the fuel electrode side collector 15, as well as the single cell 10A, the frame 17 is arranged on both the left and right sides of the air electrode side collector 14 (i.e., the frame 17 forms a frame (see FIG. 3) in which the top and bottom ends of the frame are interconnected by backup plates 17a and 17b on the outermost side only), and the frame 18 is provided on the peripheral edge portions of the fuel electrode side collector 15 and the single cell 10A.

In this example, the collectors 14 and 15 formed of mesh members that form the gas diffusion portions and the spacer portions in the present invention are made of thin metal plates of expanded metal which has a thickness on the order of 0.2 mm, for example. Also, the separator substrate 16 is formed of an even thinner thin metal plate. The metal may be, for example, a metal that is conductive and anticorrosive, such as stainless steel, a nickel alloy, a titanium alloy, or one of those metals that has been, for example, gold plated or otherwise treated for anticorrosion and conductibility. The frames 17 and 18 are made of suitable insulating material.

The overall shape of the air electrode side collector 14 is rectangular and horizontally long (the bottom side, however, is slanted in order to improve the draining effect). As shown in detail in the enlarged portion in FIG. 7, the air electrode side collector 14 is a wavy plate made from a mesh plate member (in the drawing, only a portion is shown as mesh in order to make it easier to see the shape of the plate surface) which has diamond-shaped air holes 143 with an aperture ratio of 59% and small protrusions 14a that have been formed by press working.

These protrusions 14a are arranged so that they travel the entire vertical length of the plate surface and are equidistant and parallel to the vertical sides (i.e., the short sides in the example shown in the drawing) of the plate member. As a result, gas flow paths are formed behind the protrusions which enable the flow rate at each portion to be the same due to the fact that the protrusions 14a are divided in a parallel fashion. The cross-sections of the protrusions 14a are roughly rectangular wave shaped, with the base side being slightly wider at the bottom due to die extraction during press working. The height of the protrusions 14a is substantially equal to the thickness of the frame 17. As a result, air flow paths A of a predetermined open area which run in the vertical direction between the frames 17 on both sides in a stacked state are ensured. Further, the ratio of the width of the protrusions 14a to the bottom portions is made equal to, or less than, 4:1 because the contact area decreases, resulting in an increase in the power collection resistance, the wider the bottom portions are with respect to the protrusions 14a.

The flat surface of a top portion 141 of each protrusion 14a serves as an abutting portion, i.e., a gas diffusion portion, which contacts the diffusion layer on the air electrode 12 side. Portions that extend in a direction intersecting with the surface of the gas diffusion electrode between protrusions 14a and the bottom portions that connects those portions together form spacer portions 142 which ensure the sectional area of the gas passage A. The bottom portions serve as abutting portions which conduct electricity between the collector 14 and the separator substrate 16.

The fuel electrode side collector 15 is made of a rectangular mesh plate member (in the drawing, only a portion is shown as mesh in order to make it easier to see the shape of the plate surface) which has cancellate diamond-shaped air holes 153 of dimensions the same as those of the air electrode side collector 14. A plurality of protrusions 15a are extrusion formed by press working. The protrusions 15a are such that top portions 151 are flat and the cross-sectional shape is one of substantially rectangular waves, just like the protrusions 14a earlier. The protrusions 15a of this collector 15, however, travel the entire width, horizontally, of the plate surface at equal distances in the vertical direction. In this case as well, gas flow paths are formed behind the protrusions which enable the flow rate at each portion to be the same due to the fact that the protrusions 15a are divided in a parallel fashion. Further, the ratio of the width of the protrusions 15a to the bottom portions is made equal to, or less than, 4:1 because the contact area decreases, resulting in an increase in the power collection resistance, the wider the bottom portions are with respect to the protrusions 15a.

The flat surface of the top portion 151 of each protrusion 15a serves as an abutting portion, i.e., a gas diffusion portion, which contacts the fuel electrode 13. Portions that extend in a direction intersecting the surface of the gas diffusion electrode between protrusions 15a and the bottom portions that connect those portions together form spacer portions 152 which ensure the sectional area of a gas passage H. The bottom portions serve as abutting portions which conduct electricity between the collector 15 and the separator substrate 16. The cross-sections of the protrusions 15a are also roughly rectangular wave shaped, with the base side being slightly wider at the bottom due to die extraction during press working. The height of the protrusions 15a, together with the thickness of the single cell 10A, essentially corresponds to the thickness of the frame 18. As a result, fuel flow paths of a predetermined open area which run horizontally through the inside of the frame 18 when they are stacked are ensured.

Both of the collectors 14 and 15 of the foregoing structures are arranged so as to sandwich the separator substrate 16 in between them with the protrusions 14a and 15a both facing outside. At this time, the bottom portions of the protrusions 14 and 15 of both the collectors 14 and 15 abut against the separator substrate 16, thereby enabling electricity to pass both ways. Also, by having the collectors 14 and 15 sandwich the separator substrate 16, the air flow paths A are formed on the back side of the portions of the collector 14 that cover the surface of the gas diffusion electrode on one side of the separator substrate 16, while the fuel flow paths H are formed as a result of the same positional relationship on the other side of the separator substrate 16. Air and water are then supplied to the air electrode 12 of the single cell 10A from the vertical air flow paths A, while hydrogen is similarly supplied to the fuel electrode 13 of the single cell 10A from the horizontal fuel flow paths H.

The frames 17 and 18 are each arranged on the outside of the separator 10B structured as described above. As shown in FIGS. 5 and 6, with the exception of the portion on the outer end (the upper-most portion in FIG. 5 and the left end in FIG. 6), the frame 17 which surrounds the collector 14 includes only vertical frame portions 171 that surround both sides along the short sides of the collector 14, and through which long holes 172 are provided in the direction of plate thickness in order to form fuel flow paths. The plate thickness of the frame 17 is comparable to the thickness of the wavy-shaped collector 14, as described above. Therefore, when the frame 17 and the collector 14 are together, the protrusions 14a of the collector 14 are in contact with the air electrode 12 of the single cell 10A, while the bottom portions are in contact with the collector 15 via the separator substrate 16. The separator substrate 16 has outer dimensions that correspond to the height and entire width of the frame 17, and is provided with similar long holes 162 in positions that overlap with the long holes 172 in the frame 17. Thus, the air flow paths A that are surrounded by the separator substrate 16 and the air electrode 12 surface of the single cell 10A and which pass vertically through the entire single cell unit are established between both vertical frame portions 171 of the frame 17.

The frame 18 that surrounds the collector 15 and the single cell 10A is the same size as the frame 17, but differs from the frame 17 in that it is a complete frame that includes both left and right vertical frame portions (although not shown in FIG. 5 due to the fact that they are farther to the right than the drawing shows, they are frame portions with the ends on both sides in the same positions as the left and right side ends of both vertical frame portions 171 of the frame 17, and a width in the horizontal direction substantially the same as that of top and bottom horizontal frame portions) and top and bottom horizontal frame portions 182. With the exception of the portion on the outer end (the lower-most portion in FIG. 2, i.e., the surface shown in FIG. 4), the frame 18 includes a thin backup plate 18a that extends parallel to the left and right vertical frame portions and overlaps with the left and right ends of the collector 15, and a thick backup plate 18b. The space surrounded by these backup plates 18a and the vertical frame portions forms the fuel flow path which is aligned with the long holes 172 that pass through the frame 17 in the direction of plate thickness.

The plate thickness of the frame 18 is comparable to the thickness of the wavy shaped collector 15, as described above. Therefore, when the frame 18 and the collector 15 are together, the protrusions 15a of the collector 15 are in contact with the fuel electrode 13 of the single cell 10A, while the bottom portions are in contact with the collector 14 via the separator substrate 16. Thus, the fuel paths H are formed in the stacking direction aligned with the long holes 172 in the vertical frame portions 171 of the frame 17 between both vertical frame portions of the frame 18 and the backup plate 18a. Further, the fuel flow paths H which are horizontal flow paths sandwiched between the separator substrate 16 and the backup plate 18a are defined by the wavy shape of the collector 15 on the inside each frame 18.

The separator 10B is formed with the collectors 14 and 15 and the separator substrate 16 being retained by the frames 17 and 18 of the above described structures. A cell module is then formed by alternately stacking the separators 10B with the single cells 10A. As shown in FIG. 2, slit-shaped air flow paths are thus formed, which travel through the entire cell module in the vertical direction, from the top surface of the cell module to the bottom surface of the cell module, in the portions that are sandwiched between the frames 18 in the stacked cell modules.

The fuel cell stack (see FIG. 1) which is formed by arranging a plurality of individual cell modules of the foregoing structure together in a case generates power by supplying air and water, which have mixed in the air manifold 22, from the top portion of the fuel cell stack 1 and hydrogen from the side. The air and water supplied to the air flow paths enter the top portion of the air flow paths in a state in which water droplets are mixed with the air flow in the form of mist (hereinafter, this state will be referred to as "mixed flow"). During steady operation of the fuel cell, the mixed flow within the air flow paths becomes heated due to the heat generated by the single cell 10A from the reaction. Some of the water droplets in the mixed flow adhere to the mesh of the collector 14. The water droplets that do not adhere to the mesh of the collector 14 are heated in the vapor phase between the collector 14 and the gas diffusion layer and evaporate, such that a latent heat cooling effect is produced which removes heat from the collector 14. This water which has become vapor retains humidity, thus suppressing evaporation of the moisture within the polymer electrolyte membrane 11 from the air electrode 12 side. The excess air, vapor, and water that have entered to air flow paths are then discharged from the openings of the air flow paths at the bottom of the cell stack.

On the other hand, the hydrogen is supplied to the fuel flow paths from the long holes in the vertical frame portions of the frame 18 on the outermost side shown in FIG. 4. It then flows into the spaces surrounded by the vertical and horizontal frame portions of each frame 18 and the backup plates 18a via the long holes 172 in the vertical frame portions 171 of the frame 17, and is supplied to the fuel electrode 13 side of the single cell 10A via the spaces sandwiched between the separator substrate 16 and the backup plate 18a. As a result, hydrogen is supplied to the fuel electrode 13 of the single cell 10A. Of the hydrogen that flows in the horizontal direction along the fuel electrode 13, the excess portion that did not contribute to the reaction is discharged to the hydrogen flow paths on the opposite side and recirculated by the pipe shown in FIG. 1 that is connected to the hydrogen flow path, and finally discharged to the combustor.

Thus, as described above, some of the water that is delivered together with the air to the fuel cell stack adheres to the mesh of the collector 14 and evaporates, while the rest evaporates without adhering to the mesh in the gas phase and removes latent heat, thus preventing the evaporation of moisture from the electrolyte membrane 11 on the air electrode 12 side. As a result, the electrolyte membrane 11 is constantly maintained in a uniformly moist state by the produced water without drying on the air electrode side 12. Also, the water supplied to the surface of the air electrode 12 removes heat from the air electrode 12 itself, thereby cooling it. As a result, the temperature of the fuel cell stack 1 can be controlled.

The flow of hydrogen within the fuel cell stack 1 is as described above. In the fuel supply system 4, the concentration of the hydrogen gas discharged from the hydrogen passage of the fuel cell stack 1 by the suction of the pump 47 is measured by the concentration sensors 45A and 45B. When the measured concentration is equal to, or greater than, a predetermined concentration, the hydrogen gas is recirculated to the hydrogen supply line 40 via the recirculation check valve 48 by closing the electromagnetic valve 52. When the measured concentration is less than the predetermined concentration, on the other hand, the hydrogen is discharged to the combustor 53 via the check valve 51 and the electromagnetic valve 52 by intermittently opening the discharge electromagnetic valve 52, such that exhaust which has been completely combusted by the combustor 53 is released to the outside air.

With this system, the fuel cell stack 1 can be sufficiently wet and cooled by supplying water to the fuel cell stack 1 in the air flow, even without providing a cooling system. At this time, the temperature of the fuel cell stack 1 can be maintained at the desired temperature by controlling the amount of water injected from the nozzles 63 into the air manifold 22. This can be done by suitably controlling the output and operating intervals of the pump 62 depending on the temperature of the exhausted air detected by the exhaust temperature sensor 32.

More specifically, the evaporation amount increases when the amount of water supplied to the fuel cell stack 1 is increased, and decreases when the amount of water supplied to the fuel cell stack 1 is decreased. Similarly, the temperature decreases when the airflow is increased, and increases when the airflow is decreased. Therefore, the operating temperature can be controlled by controlling the amount of water and airflow supplied. Water that is discharged together with air from the fuel cell stack 1 is discharged with most of it being in a liquid state. Therefore, that water flows to the water return line 60a, is drawn up by the pump 65 and returned to the water tank 61 via the check valve 66. The water that has evaporated and is therefore in the form of vapor, or water that is not recovered to the water return line 60a is condensed by the water condenser 31 so that it is liquefied, and then drawn up by the pump 65 and returned to the water tank 61. Some of the water vapor in the exhausted air is thought to come from the reaction water following a power generating reaction of the fuel cell stack 1. The water level in the water tank 61 is monitored by the water level sensor 64.

This system has several characteristics. First, the collectors 14 and 15 are fine mesh with air holes formed over the entire contact surface that is in contact with the gas diffusion layer, such that a mixed flow of air and water becomes agitated when it passes through the air holes, and a mixed gas is supplied to a contact surface of the gas diffusion layer that is in contact with the collectors 14 and 15. As a result, air can be evenly supplied to the entire electrode surface in the fuel cell stack 1, thereby making it possible to reduce the concentration polarization. Also, contact at the mesh between the electrode and the collector enables power to be collected evenly from the entire electrode, so power collection resistance is reduced. Furthermore, the catalyst of the entire electrode can be used effectively so the activation polarization is reduced. This system is also advantageous in that the effective area of the electrode can be increased.

Figure 8:
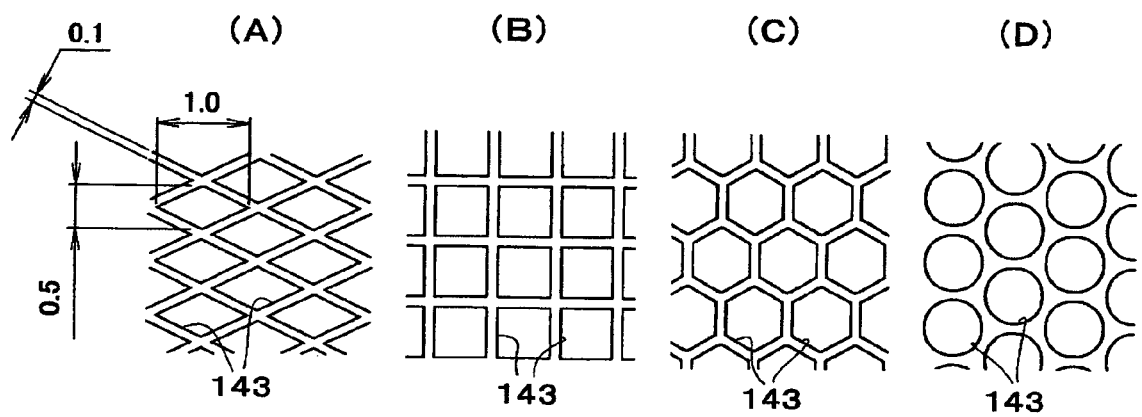
FIG. 8 is a top view of representative example shapes of the mesh of the separator.

In the first exemplary embodiment described above, an example was described in which the mesh of the collectors 14 and 15 of the separator is diamond-shaped. The mesh of the collectors 14 and 15 is not limited to being diamond-shaped, however. Alternatively, it may be any of a variety of shapes. FIG. 8 shows representative example shapes of the air holes. Regardless of which shape is employed, the fact that the distance between any two adjacent air holes is constant is effective for making the gas diffusion even. It is also desirable that the distance between edges of adjacent air holes also be substantially constant in order to prevent the air holes from clogging due to water adhering to the mesh, particularly at the collector 14.

The example illustrated in FIG. 8(A) shows diamond-shaped mesh of an expanded metal that has been applied to the first exemplary embodiment. With this shape, when the dimension in the horizontal direction of the opening 143 (hereinafter, only the reference numerals of the collector 14 will be noted) which is an air hole is, for example, 1 mm, the dimension in the vertical direction is 0.5 mm, and the width of the edge portions between openings is 0.1 mm, the aperture ratio is 68.4%. This opening shape can also be realized with a screen of bent wire.

The example illustrated in FIG. 8(B) is one example of rectangular openings, and shows punched metal mesh in which square air holes 143 have been punched out. In this example, the opening pitch of the air holes 143 is the same in both the vertical and horizontal directions, resulting in a vertical and horizontal lattice-shaped mesh. Alternatively, however, a similar opening ratio can also be achieved by an arrangement in which the opening positions are offset half a pitch in the vertical or horizontal direction. This opening shape can also be realized with a screen of bent wire.

The example illustrated in FIG. 8(C) is one example of polyangular openings, and shows punched metal mesh in which air holes 143 having six sides each have been punched out. In this example, the mesh is honeycomb shaped. This opening shape can also be realized with a screen of bent wire.

The example illustrated in FIG. 8(D) shows punched metal mesh in which circular air holes 143 have been punched out. It is the simplest example of round openings. In this case, the opening pitch of the air holes 143 is set such that the distance between the centers of any two adjacent air holes is the same. As a result, a generally lattice-shaped mesh having a large aperture ratio is formed. With this shape, an exceptional effect is achieved when the aperture ratio is 25% or greater and the hole diameter is 0.5 to 1.0 mm, inclusive.

The first exemplary embodiment employs a structure that ensures the passage area by the bent shapes of the collectors 14 and 15 alone. Alternatively, however, the passage area can also be ensured by the shape of the separator substrate 16 together with the shapes of the collectors 14 and 15. Next, other exemplary embodiments in which the bent shapes of the collectors 14 and 15 have been modified will be described.

Second Embodiment

Figure 9:
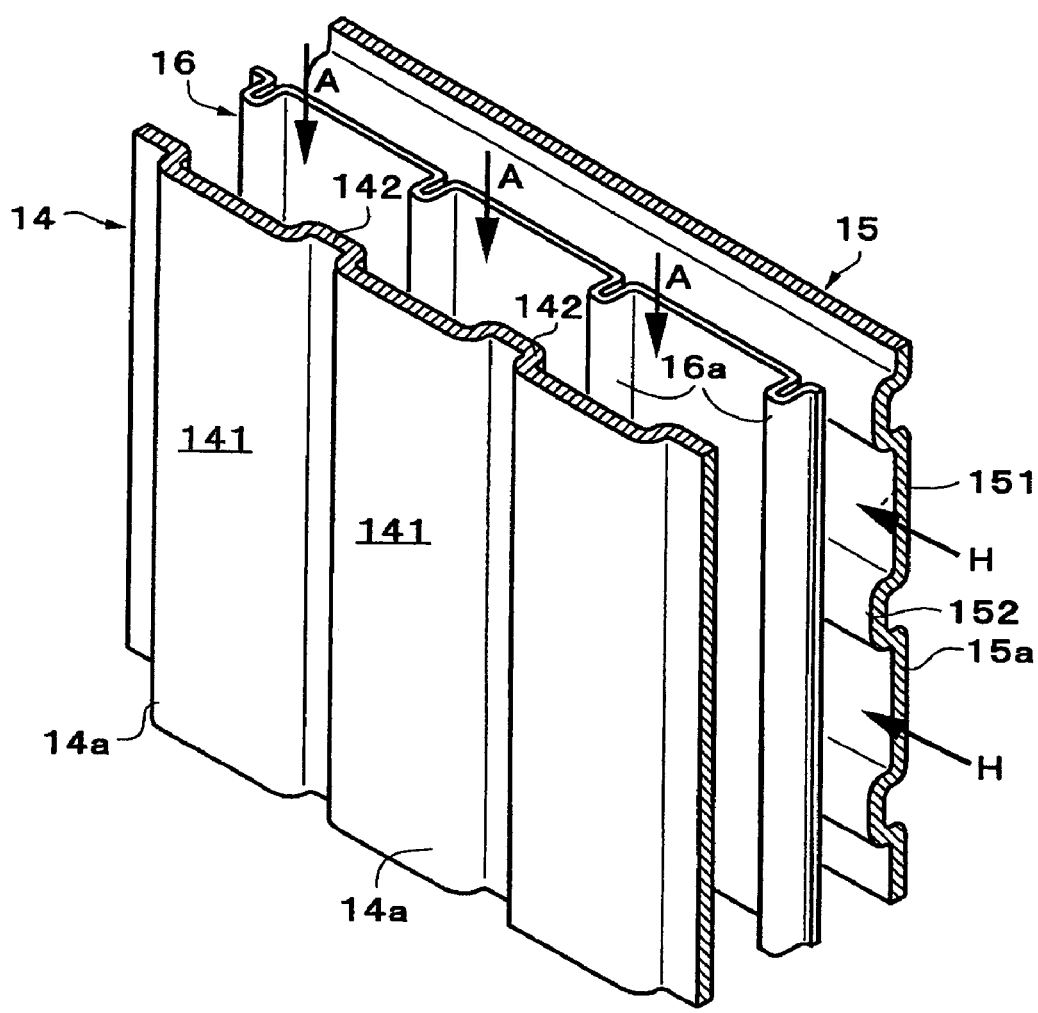
FIG. 9 is a partial exploded perspective view of a portion of a separator according to a second exemplary embodiment of the present invention.

A second exemplary embodiment shown next in FIG. 9 has the same wave dimensions, i.e., wave height and pitch, as does the collector 15 on the fuel electrode side in the first exemplary embodiment in order to be able to use the same material of the collectors 14 and 15. When this structure is employed, protrusions 16a that protrude toward the collector 14 side are formed on the separator substrate 16 at a pitch that matches the pitch at which the bottom portions of the collector 14 are arranged, such that the separator substrate 16 is also a wavy plate shape in order to ensure the flow path sectional area on the air electrode side where the wave height is lower. Hereinafter, portions in this exemplary embodiment that are the same as those in the first exemplary embodiment will be denoted by the same reference numerals, and descriptions of those portions will be omitted. Only those parts that differ from the first exemplary embodiment will be described here.

The height of the protrusions 16a of the separator substrate 16 in this exemplary embodiment is set such that the sum of the height of the protrusions 16a and the height of the protrusions 14a of the collector 14 equals the height of the protrusions of the collector 14 in the first exemplary embodiment. As a result, the sectional area of the flow path on the air electrode side can be the same as it is in the first exemplary embodiment.

In this exemplary embodiment as well, the mesh shape of the collectors 14 and 15 can be any one of the examples given above. The direction of the mesh is arbitrary because it does not affect the gas diffusivity or water retentivity in both this exemplary embodiment and the first exemplary embodiment described earlier. In FIG. 9, the notation indicating the mesh is omitted.

In the second exemplary embodiment as well, the collectors 14 and 15 that contact the diffusion layer are fine mesh, just as in the first exemplary embodiment. As a result, the air is able to be supplied evenly to the entire electrode surface in the fuel cell stack 1, thereby enabling the concentration polarization to be reduced. Also, mesh contact between the electrode and the collector enables power to be evenly collected from the entire electrode, so power collection resistance decreases. Furthermore, the catalyst of the entire electrode can be used effectively so activation polarization is reduced. Also, the effective area of the electrode is also able to be increased, which is also advantageous.

Third Embodiment

Figure 10:
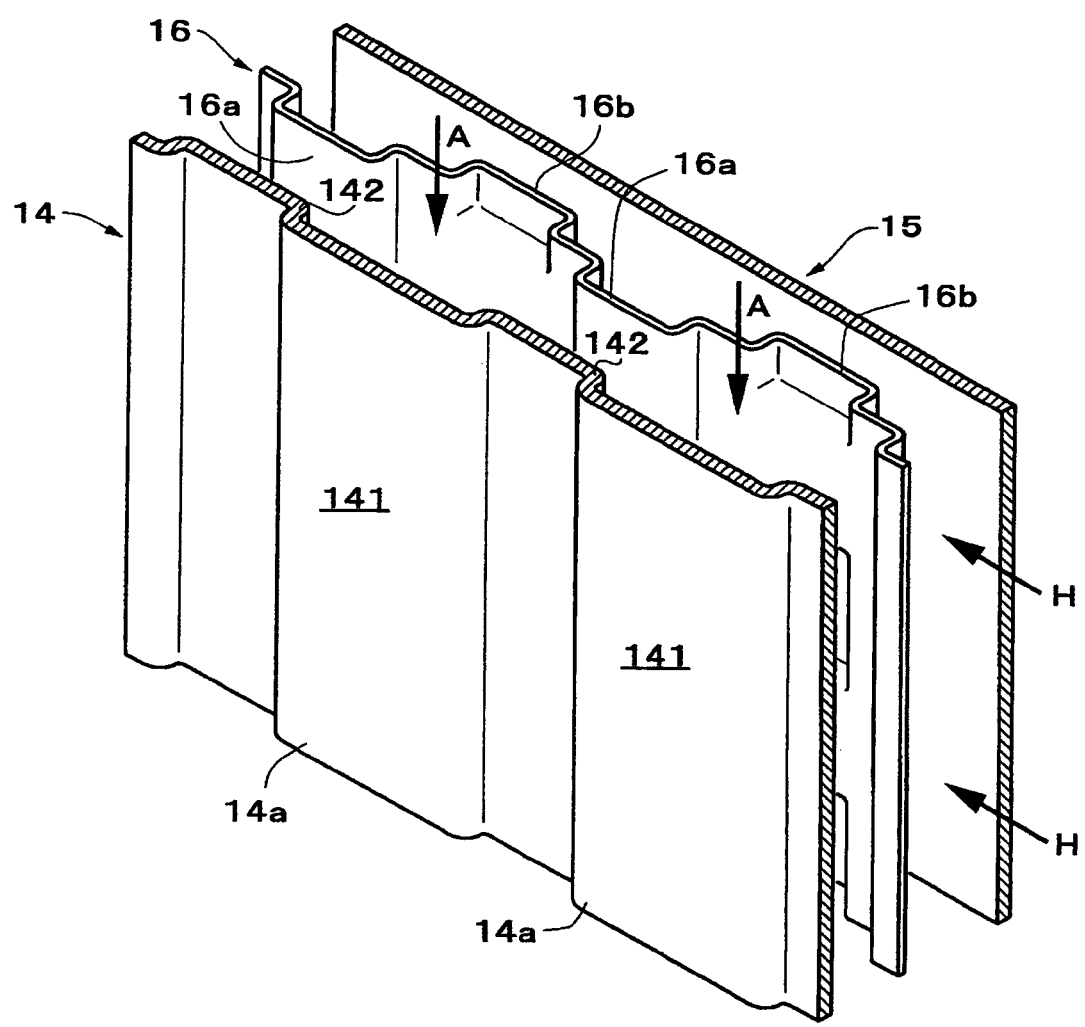
FIG. 10 is a partial exploded perspective view of a portion of a separator according to a third exemplary embodiment of the present invention.

The example shown next in FIG. 10 is an example in which the collector 15 on the fuel electrode side is formed with a flat mesh member with no waves which is outside of the application of the present invention. With this example, the separator substrate 16 is formed of a wavy plate that forms continual protrusions 16*a* and 16*b* that protrude to both the air electrode side and the fuel electrode side with respect to a reference surface of the substrate. All other structure is the same as that in the second exemplary embodiment, with like portions denoted by like reference numerals. Descriptions thereof would be redundant and so will be here.

What is claimed is:

1. A separator for use with a fuel cell, and for being inserted between single cells thereof, each single cell having an electrolyte sandwiched between electrodes, in order to stack the single cells together, the separator comprising: gas diffusion portions which are arranged so as to cover a surface of the electrodes and in which are formed multiple diamond-shaped air holes for gas diffusion; and spacer portions which form parallel divided gas passages on the back side of portions of the gas diffusion portions which cover the surface of the electrodes, wherein the gas diffusion portions and the spacer portions are integrally formed by bending an expanded metal member to have a rectangular corrugated plate shaped cross-section; and wherein the distance between edges of adjacent air holes is equal to, or less than, 0.3 mm, and a dimension of the diamond-shaped air holes in a vertical direction is 0.5 mm and a dimension of the diamond-shaped air holes in a horizontal direction is 1.0 mm.

2. A fuel cell having the separator according to claim 1 inserted between single cells that are stacked together, each single cell having an electrolyte sandwiched between electrodes.

3. The fuel cell according to claim 2, wherein the expanded metal member is repeatedly bent in a rectangular corrugated plate shape with the ratio of the width of the gas diffusion portion and the distance between adjacent gas diffusion portions being equal to, or less than, 4:1.

4. The fuel cell according to claim 2, wherein the expanded metal member has an aperture ratio of equal to, or greater than, 25%.

5. The fuel cell according to claim 2, wherein the expanded metal member is such that the distance between edges of adjacent air holes is substantially constant.

6. A fuel cell in which a separator that is inserted between single cells, each single cell having a polymer electrolyte membrane sandwiched between electrodes, in order to stack the single cells together, wherein the separator includes gas diffusion portions which are arranged so as to cover a surface of the electrodes and in which are formed multiple air holes for gas diffusion, and spacer portions which form parallel divided gas passages on the back side of portions of the gas diffusion portions which cover the surface of the electrodes; and the gas diffusion portions and the spacer portions are integrally formed by bending an expanded metal to have a rectangular corrugated plate shaped cross-section;

wherein the single cell is formed by sandwiching the polymer electrolyte membrane between carbon cloth via a catalyst layer; and the gas diffusion portions are structured such that the distance between edges of adjacent diamond-shaped air holes is equal to, or less than, 0.3 mm in order to reduce the area over which water produced by the single cell adheres and diffuse the pressure toward the carbon cloth over the entire surface; and a dimension of the diamond-shaped air holes in a vertical direction is 0.5 mm and a dimension of the diamond-shaped air holes in a horizontal direction is 1.0 mm.

\* \* \* \* \*